United States Patent [19]

Morishita et al.

[11] Patent Number: 4,754,828

[45] Date of Patent: Jul. 5, 1988

[54] MOTOR-DRIVEN POWER STEERING SYSTEM FOR A VEHICLE

[75] Inventors: Mitsuharu Morishita; Shinichi Kohge, both of Himeji, Japan

[73] Assignee: Mitsubishi Denki Kabushiki Kaisha, Japan

[21] Appl. No.: 44,051

[22] Filed: Apr. 29, 1987

[30] Foreign Application Priority Data

Apr. 29, 1986 [JP] Japan ............................ 61-100052
Apr. 29, 1986 [JP] Japan ............................ 61-100060

[51] Int. Cl.⁴ ............................................. B62D 5/04
[52] U.S. Cl. .................................... 180/79.1; 364/424
[58] Field of Search ............... 180/79.1, 142; 364/424; 74/388 PS

[56] References Cited

U.S. PATENT DOCUMENTS 4,651,840  3/1987  Shimizu et al. ............... 180/142 X
4,660,669  4/1987  Shimizu ........................ 74/388 PS

FOREIGN PATENT DOCUMENTS 2577878  8/1986  France .
2579547  10/1986  France .

57-22967  2/1982  Japan .
59-50864  3/1984  Japan .

Primary Examiner—John A. Pekar
Attorney, Agent, or Firm—Leydig, Voit & Mayer

[57] ABSTRACT

A motor-driven power steering system for a vehicle having a motor operatively connected to the steerable road wheels of the vehicle and a clutch arrangement interposed therebetween for selectively establishing and interrupting the transmission of power-assisting force from the motor to the road wheels in accordance with vehicle speed and operator-induced steering torque resulting from the steering force exerted on the steering wheel. The current to be supplied to the motor and the clutch arrangement for controlling the respective running and switching operations thereof is calculated on the basis of a value which corresponds to the detected steering torque and a prescribed constant which corresponds to the rate of change for the steering torque so that fluctuations in the steering torque due to time lags in operation of various component members can be substantially suppressed or reduced, thus preventing resultant vibrations of the steering system for a smooth and stable steering operation.

5 Claims, 7 Drawing Sheets

MOTOR-DRIVEN POWER STEERING SYSTEM FOR A VEHICLE

BACKGROUND OF THE INVENTION

1. Field of the Invention

This invention relates to a motor-driven power steering system for a vehicle adapted to assist the operator-induced steering operation by means of the rotating force of a motor.

2. Description of the Prior Art

In the past, a conventional power steering system of this type, as schematically illustrated in FIG. 1, has hitherto been known in which a steering wheel 1 is operatively connected through a steering shaft 2 having an upper portion 2a and a lower portion 2b and a first rack and pinion gear $T_1$ including a first pinion 5 and a first rack tooth portion 6a with a steering rack 6 which is connected at its opposite ends with a pair of steerable road wheels (not shown) through a pair of tie rods 8a and 8b so that when the steering wheel 1 is turned by an operator, the steerable road wheels (not shown) are appropriately steerable in accordance with the steering motion of the steering wheel 1 exerted by the operator. On the other hand, the steering rack 6 is operatively connected with a motor 13 through a second rack and pinion gear $T_2$ including a second rack tooth portion 6b and a second pinion 17, a speed-reduction gear R, and a switching clutch 16 so that the driving force of the motor 13 is transmitted through the speed-reduction gear R, the switching clutch 16 and the second rack and pinion gear $T_2$ to the rack 6 so as to assist the steering operation of the steering wheel 1 exerted by the operator. The motor 13 is electrically connected with a battery 11 through a control unit 9 and a key or ignition switch 12 so that it is energized by the battery 11 under the control of the control unit 9. The control unit 9 is input with control signals from a steering-torque sensor 3 and a vehicle-speed sensor 10 so as to appropriately control the operations of the motor 13 and the switching clutch 17 on the basis of the steering torque and the vehicle speed measured.

However, the power steering system as constructed above has the following problems. Specifically, as illustrated in FIG. 2, during transmission of the power-assisting force from the motor 13 to the steering rack 6, there will be a delay in operation caused by various elements such as the motor 13, the speed-reduction gear R including the worm 14 and the worm wheel 15, and the like, so that some time lag will develop until power assist to the steering motion induced by the operator is actually effected. Further, as shown in FIG. 3, the current supplied to the motor 13 generally fluctuates at a relatively long period $t_{D1}$. Accordingly, due to such a time lag in operation in addition to the fluctuation of the relatively large period $t_{D1}$ in the current supplied to the motor 13, the steering torque of the steering system power assisted by the motor 13 also fluctuates with a relatively great amplitude $T_{S1}$, thereby causing the steering system to vibrate. As a result, smooth and stable steering operation is impaired.

Further, when the travelling speed of the vehicle increases above or decreases below a prescribed level, the control unit 9 operates to deenergize or energize the switching clutch 17 to interrupt or establish the transmission of the assisting force from the motor 13 to the rack 6 so as to switch the steering system into a manual steering mode without any power assist or into a power steering mode with power assist. Accordingly, whenever the vehicle speed changes across a prescribed speed level, the operating mode of the steering system abruptly changes from power steering into manual steering or vice versa, thus causing the operator to feel a certain unsmoothness, unsureness, or instability in the steering. In this case, even if such a change in steering mode is effected at the time when the steering torque is very small in order to avoid the above situation, there might be great shock developed due to the fluctuation in the steering torque and the time lag in operation when the steering mode is actually changed. This also impairs smooth steering operation.

SUMMARY OF THE INVENTION

In view of the above, the present invention has the objective of eliminating the above-described problem of the prior art, and has for its main object the provision of a novel and improved motor-driven power steering system for a vehicle in which fluctuation in the steering torque due to time lags in operation of various component members can be substantially suppressed or reduced to effectively prevent resultant vibrations of the steering system, thereby ensuring smooth and stable steering operation as well as enabling the steering system to be switched or transferred from power steering into manual steering or vice versa in an extremely smooth manner, and which can be incorporated in an existing motor-driven power steering system without incurring any substantial increase in manufacturing costs.

In order to achieve the above object, according to the present invention, there is provided a motor-driven power steering system for a vehicle having a steering wheel operatively connected to steerable road wheels in response to force exerted thereon by an operator, the motor-driven power steering system comprising:

a torque sensor connected to detect operator-induced steering torque resulting from steering force exerted on the steering wheel by the operator to generate an output signal representative of the detected steering force;

a vehicle-speed sensor for detecting vehicle speed to generate an output signal representative of the detected vehicle speed;

a motor operatively connected with the steerable road wheels and connected to be energized by a source of electric power to transmit a force to the steerable road wheels for power assisting steering motion caused by the operator through the steering wheel;

a clutch means interposed between the motor and the steerable road wheels and connected to be switched on and off for selectively establishing and interrupting the transmission of the power-assisting force from the motor toward the steerable road wheels in accordance with the vehicle speed; and a control unit connected to receive output signals from the torque sensor and the vehicle-speed sensor for controlling respective running and switching operations of the motor and the clutch means in such a manner that fluctuations in the steering torque due to time lags in operation during transmission of the power-assisting force from the motor to the steerable road wheels are substantially reduced.

In one preferred embodiment, the control unit comprises:

a steering-torque measuring means adapted to receive the output signal from the torque sensor for measuring the operator-induced steering torque;

a vehicle-speed measuring means adapted to receive the output signal from the vehicle-speed sensor for measuring the vehicle speed;

a steering-torque change-rate calculating means adapted to calculate a rate of change per unit time of the steering torque on the basis of a presently measured steering torque value and a precedingly measured steering torque value, and generate an output signal representative of the calculated steering-torque change rate;

a first memory means for storing motor-current multipliers corresponding to varying steering-torque change rates;

a second memory means for storing motor-current values corresponding to varying steering torque values;

a motor-current determining means connected to receive output signals from the steering-torque measuring means, the vehicle-speed measuring means, and the steering-torque change-rate calculating means to determine and read out from the first and second memory means an appropriate motor-current multiplier corresponding to the calculated steering-torque change rate and an appropriate motor-current value corresponding to the measured steering torque on the basis of the multipliers and values respectively stored in the first and second memory means so as to calculate a current to be supplied to the motor by multiplying the appropriate motor-current value by the appropriate motor-current multiplier;

a motor-current controlling means for controlling the running operation of the motor in accordance with the calculated current from the motor-current determining means; and a clutch controlling means for controlling the switching operation of the clutch means on the basis of the calculated current from the motor-current determining means.

In this embodiment, the motor-current determining means determines whether or not the measured vehicle speed is less than a first reference speed level and a second reference speed level which is greater than the first reference speed level, and the control unit includes means to control respective running and switching operations of the motor and the clutch means in such a manner that when the measured vehicle speed is less than the first reference speed level, the calculated current, as determined by the motor-current determining means, is supplied to the motor and the clutch means is switched on; that when the measured vehicle speed is at least equal to the first reference speed level but less than the second reference speed level, the current supplied to the motor is reduced to an offset current level and the clutch means is switched on; and that when the measured vehicle speed is at least equal to the second reference speed level, the current supplied to the motor is made to be zero and the clutch means is switched off.

In another preferred embodiment, the control unit comprises:

a steering-torque measuring means connected to receive the output signal from the torque sensor for measuring the operator-induced steering torque;

a vehicle-speed measuring means connected to receive the output signal from the vehicle-speed sensor for measuring the vehicle speed;

a steering-torque change-rate calculating means connected to calculate a rate of change per unit time of the steering torque on the basis of a presently measured steering torque value and a precedingly measured steering torque value, and generate an output signal representative of the calculated steering torque change rate;

a first memory means for storing motor-current constants corresponding to varying steering-torque change rates;

a second memory means for storing motor-current values corresponding to varying steering torque values;

a motor-current determining means connected to receive output signals from the steering-torque measuring means, the vehicle speed measuring means, and the steering-torque change-rate calculating means to determine an appropriate motor-current constant corresponding to the calculated steering-torque change rate and an appropriate motor-current value corresponding to the measured steerng torque on the basis of the constants and values respectively stored in the first and second memory means so as to calculate a current to be supplied to the motor by adding the appropriate motor-current value to the appropriate motor-current constant;

a motor-current controlling means for controlling the running operation of the motor in accordance with the calculated current from the motor-current determining means; and a clutch controlling means for controlling the switching operation of the clutch means on the basis of the calculated current from the motor-current determining means.

In this embodiment, the motor-current determining means determines whether or not the measured vehicle speed is less than a first reference speed level and a second reference speed level which is greater than the first reference speed level. The control unit includes means to control respective running and switching operations of the motor and the clutch means in such a manner that when the measured vehicle speed is less than the first reference speed level, the calculated current, as determined by the motor-current determining means, is supplied to the motor and the clutch means is switched on; that when the measured vehicle speed is at least equal to the first reference speed level but less than the second reference speed level, the current supplied to the motor is reduced to an offset current level and the clutch means is switched on; and that when the measured vehicle speed is at least equal to the second reference speed level, the current supplied to the motor is made to be zero and the clutch means is switched off.

The above and other objects, features and advantages of the present invention will become apparent from the following detailed description of a few presently preferred embodiments of the invention when taken in conjunction with the accompanying drawings.

BRIEF DESCRIPTION OF THE DRAWINGS

FIGS. 4 through 8 relate to a motor-driven power steering system in accordance with one embodiment of the present invention, in which;

FIG. 4 is a block diagram showing a control unit and its related parts;

FIG. 5 is a characteristic view showing a relationship between the motor current and the steering torque;

FIG. 6 is a characteristic view showing a vehicle-speed/motor-current relationship and a vehicle-speed/-clutch-voltage relationship;

FIG. 7 shows a relationship between the motor current and the time-related change or fluctuation in the steering torque; and FIG. 8 is a flow chart showing the control process of the power steering system of FIG. 1 as controlled by the control unit of FIG. 4;

DESCRIPTION OF THE PREFERRED EMBODIMENTS

Figure 1:
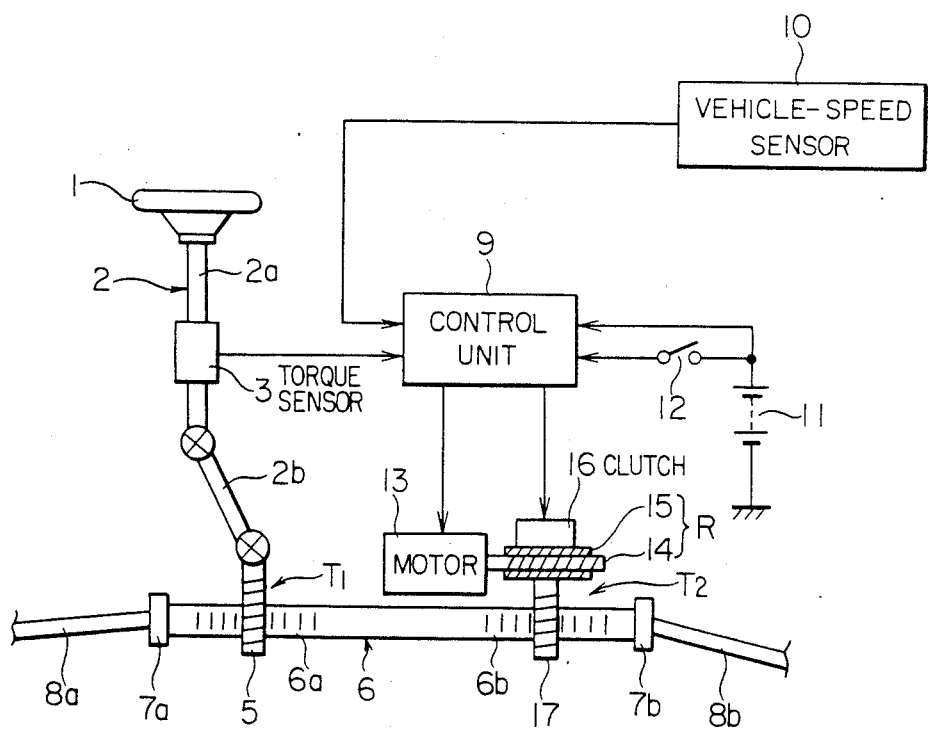
FIG. 1 is a schematic view illustrating a general arrangement of a motor-driven power steering system for a vehicle having a conventional control unit.

The present invention will now be described in detail with reference to a few presently preferred embodiments thereof as illustrated in the accompanying drawings. In the following, the same parts or elements of the embodiments will be identified by the same reference numerals and characters as employed in FIG. 1.

Figure 4:
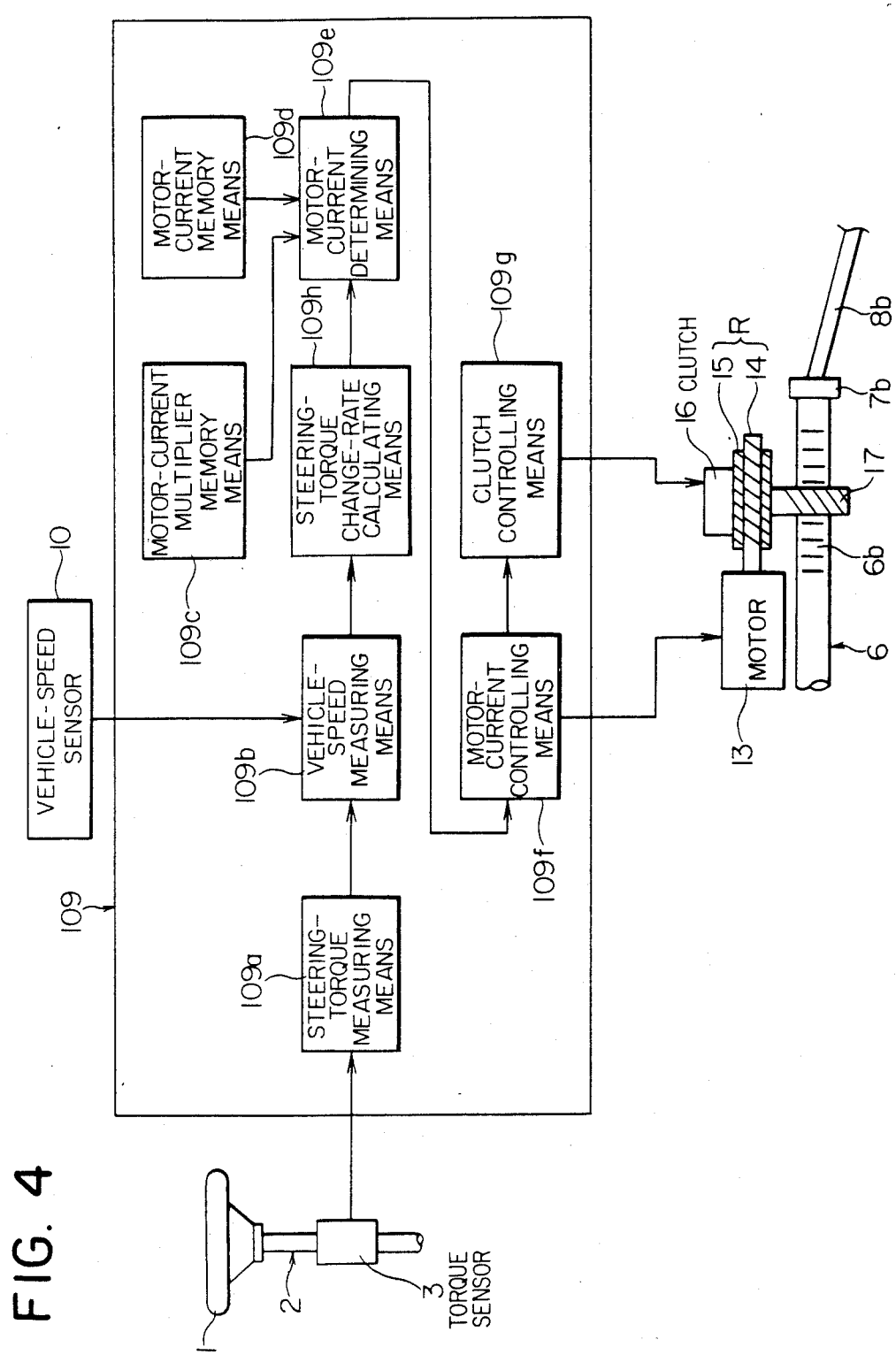

Referring to the drawings and first to FIG. 4, there is shown a control unit 109 constructed in accordance with one embodiment of the present invention and adapted for controlling the operation of the motor-driven power steering system illustrated in FIG. 1. As diagrammatically illustrated in FIG. 4, the control unit 109 is adapted to receive the output signals from a torque sensor 3 and a vehicle-speed sensor 10 for controlling the operations of a motor 13 and a clutch means 16 in the form of an electromagnetic switching clutch in such a manner that fluctuation in the steering torque is substantially reduced.

As shown in FIG. 4, the control unit 109 comprises: a steering-torque measuring means 109a connected to receive the output signal of the torque sensor 3 for measuring the operator-induced steering torque; a vehicle-speed measuring means 109b connected to receive the output signal of the vehicle-speed sensor 10 for measuring the travelling speed of the vehicle; a steering-torque change-rate calculating means 109h connected to calculate a rate of change per unit time of the steering torque on the basis of a presently measured steering torque value and a precedingly measured steering torque value, and generate an output signal representative of the calculated steering-torque change rate; a first memory means 109c in the form of a motor-current multiplier memory means for storing motor-current multipliers which correspond to varying steering-torque change rates; a second memory means 109d in the form of a motor-current memory means for storing motor-current values which correspond to varying steering torque values; a motor-current determining means 109e connected to receive the output signals from the steering-torque measuring means 109a, the vehicle-speed measuring means 109b, the steering-torque change-rate calculating means 109h, and the first and second memory means 109c and 109d and read out from the first and second memory means 109c and 109d an appropriate motor-current multiplier which corresponds to the measured vehicle speed and an appropriate motor-current value which corresponds to the measured steeering torque to multiply the read-out motor-current value by the read-out motor-current multiplier so as to determine an appropriate current value supplied to the motor 13; a motor-current controlling means 109f for controlling the current supplied to the electromagnetic switching clutch 16 in accordance with the output from the motor-current determining means 109e; and a clutch controlling means 109g connected to switch on or off the electromagnetic switching clutch 16 on the basis of the output from the motor-current determining means 109e.

Figure 5:
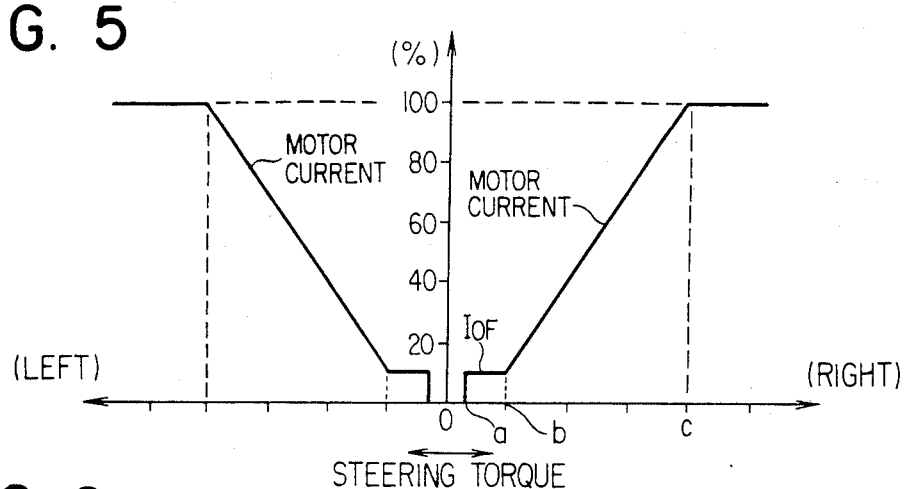

Now, the operation of the above-described control unit 109 will be described in detail with reference to FIGS. 4 through 8. First, the case in which a vehicle is stationary or standing still will be considered. In this case, when a key or ignition switch (not shown) is first turned on to start the engine, the electromagnetic switching clutch 16 is automatically actuated to place the second pinion 17 into mechanical coupling with the worm wheel 15. In this state, when the steering wheel 1 is turned by an operator, the control unit 109 acts to control the operation of the motor 13 in the form of a DC motor in the manner as illustrated in FIG. 5. More specifically, when steering torque increases in the right-hand direction to point a in FIG. 5, the motor 13 is turned on or energized and supplied with an offset current of a certain low level $I_{OF}$ (for example, about 2 to 10 amperes) in order to alleviate the inertia influence from the motor 13 and the mechanical portions of the steering system. As the steering torque further increases, the current supplied to the motor 13 begins to linearly increase at point b in direct proportion to the intensity of steering torque, and reaches 100% current at point c. On the other hand, as the steering torque decreases, current flowing through the motor 13 begins to decrease at point c and becomes to be the offset level $I_{OF}$ at point b. When the steering torque further decreases and reaches point a, the current supply to the motor 13 is reduced to zero and the motor 13 is stopped. Similar to this, the motor 13 is controlled in the same manner when the steering torque increases or decreases in the lefthand direction. In this connection, it is to be noted that the power-assisting torque generated by the motor 13 is in direct proportion to the current supplied thereto.

Accordingly, as pictured in FIG. 5, as the steering torque increases, the motor 13 is energized or turned on at point a and supplied with the offset current $I_{OF}$. As the steering torque further increases, the current supplied to the motor 13 begins to gradually increase at point b so that the output torque of the motor 13 to be transmitted to the worm 14 accordingly increases gradually. As a result, the assisting torque having the intensity corresponding to the operator's steering effort applied to the steering wheel 1 is transmitted to the second rack tooth portion 6b on the steering rack 6 through the intermediary of the worm wheel 15, the electromagnetic switching clutch 16 and the second pinion 17, thereby lightening the steering operation for the operator.

Figure 2:
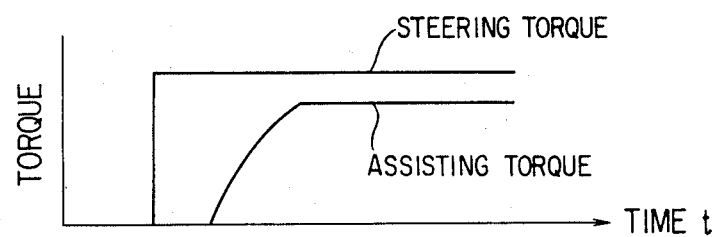
FIG. 2 shows a relationship between the steering torque and the power-assisting torque over time of the motor-driven power steering system illustrated in FIG. 1.

Now, the case in which the vehicle is travelling will be considered. In this case, as previously described in respect of the prior art illustrated in FIGS. 1 through 3, there will be a time lag, as shown in FIG. 2, between the time when power-assisting force is generated by the motor 13 and the time when the power-assisting force is actually transmitted to the steerable road wheels due to delays in operation of the various component members such as the motor 13, the worm 14, the worm wheel 15 and the like which will inevitably develop during transmission of the power-assisting force from the motor 13 to the steerable road wheels. For this reason, fluctuation in the steering torque will be developed to vibrate the steering system as a whole.

Figure 3:
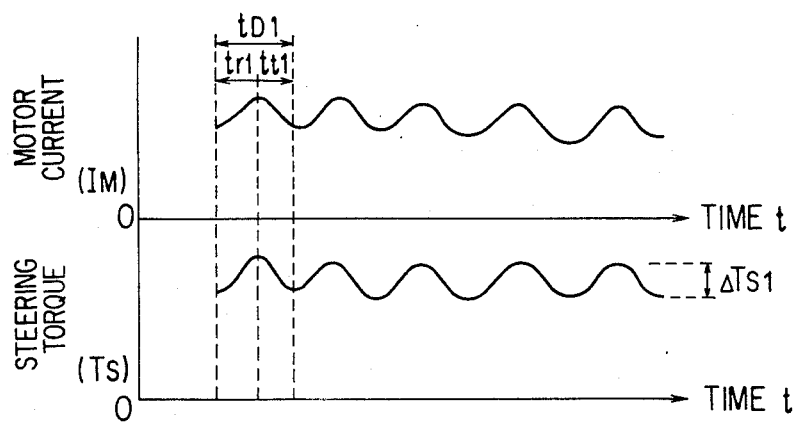
FIG. 3 shows a relationship between the motor current and the time-related change or fluctuation in the steering torque of the steering system of FIG. 1.
Figure 6:
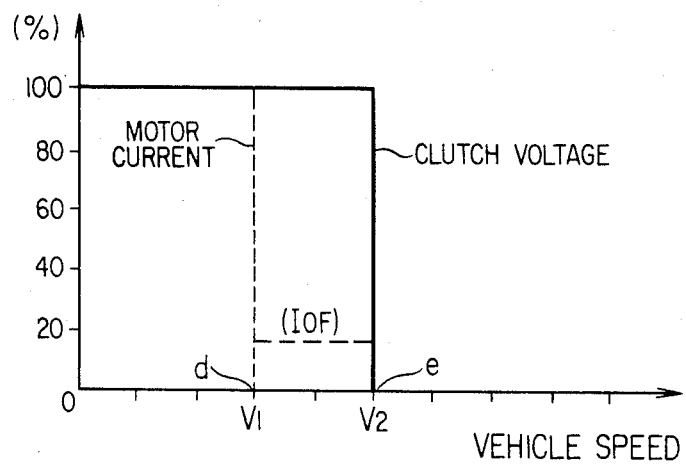
Figure 7:
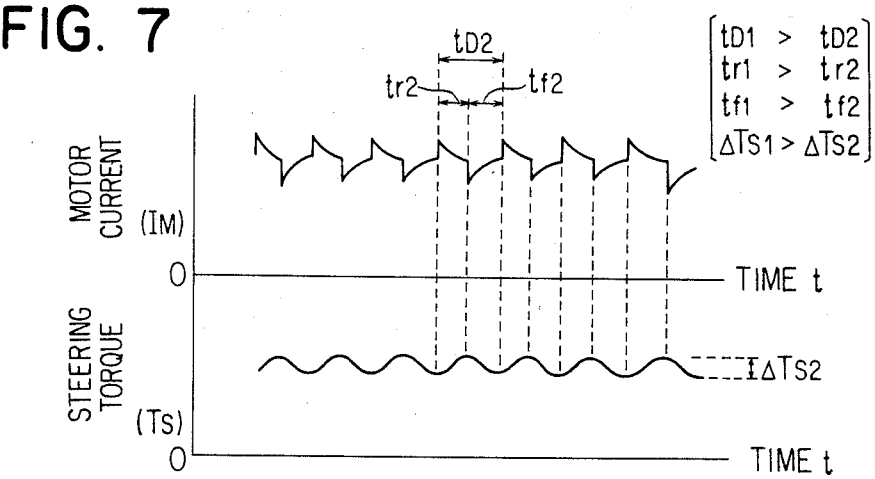
Figure 8:
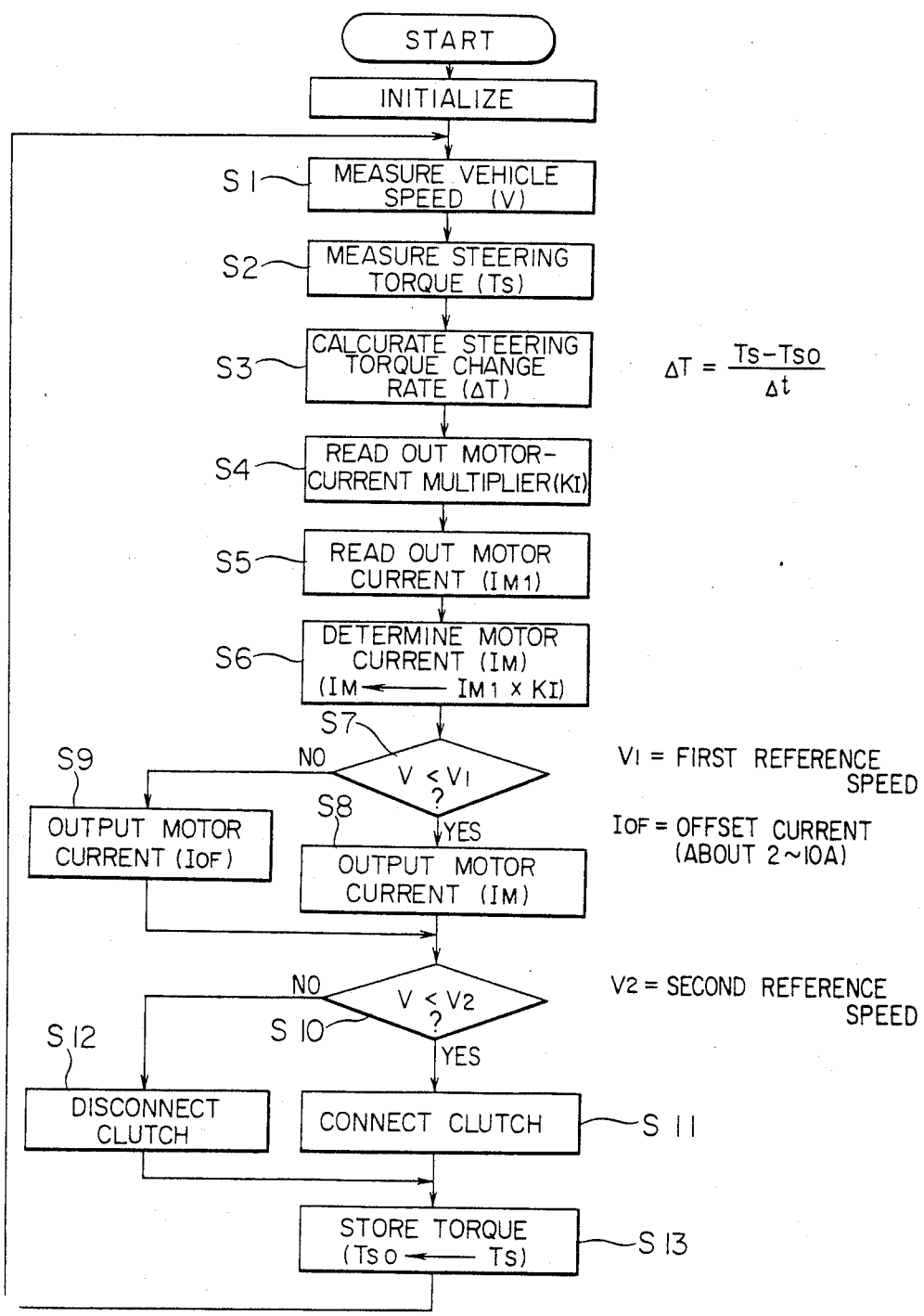

In order to avoid such a situation, according to the present invention, as shown in FIGS. 6 through 8, the control unit 109 controls the operation of the motor 13 such that, as shown in FIG. 7, the current $I_M$ supplied to the motor 13 is controlled to change derivaratively or more minutely in a smaller period $t_{D2}$ on the basis of the steering torque $T_S$ and the change rate of the steering torque $\Delta T$ in such a manner as to substantially reduce fluctuation $\Delta T_{S2}$ in the steering torque as compared with the fluctuation $\Delta T_{S1}$ in the steering torque of the prior art as shown in FIG. 3 in which the steering torque fluctuates at a greater amplitude $\Delta T_{S1}$ and in a greater period $t_{D1}$. According to this embodiment, the motor current $I_M$ is calculated by multiplying an appropriate motor-current value $I_{M1}$ which corresponds to the measured steering torque $T_S$ by an appropriate motor-current multiplier $K_I$ which corresponds to the calculated steering-torque change rate $\Delta T$. To this end, the motor-current determining means 109e acts to calculate the steering-torque change rate $\Delta T$ by dividing the difference between the presently measured steering-torque value $T_S$ and the immediately precedingly measured steering-torque value $T_{S0}$ by the time period $\Delta t$ therebetween. The motor-current determining means 109e also reads out from the motor-current multiplier memory means 109c the appropriate motor-current multiplier $K_I$ which corresponds to the absolute value of the measured steering torque $IT_SI$ as well as to an increase or decrease in the steering torque, and reads out from the motor-current memory means 109d the appropriate motor-current value $I_{M1}$ which corresponds to the measured steering torque $T_S$. In this connection, it is to be noted that the motor-current multipliers $K_I$ are empirically determined with respect to the steering-torque change rates $\Delta T$ through experiments. An example of such motor-current multipliers $K_I$ is shown in Table 1 below. From this Table, it will be noted that the motor-current multiplier $K_I$ takes the greater value (above 1) as the steering-torque change rate $\Delta T$ becomes greater if the steering torque $T_S$ is increasing, but the smaller value (below 1) as the steering-torque change rate $\Delta T$ becomes greater if the steering torque $T_S$ is decreasing.

TABLE 1

| $\Delta T$ | $K_I$ |
|---|---|
| +7 or above | 2.0 |
| +6 −+5 | 1.5 |
| +4 −+3 | 1.25 |
| +2 −−2 | 1.0 |
| −3 −−4 | 0.5 |
| −5 −−6 | 0.25 |

TABLE 1-continued

| $\Delta T$ | $K_I$ |
|---|---|
| −7 or below | 0 |

More specifically, as illustrated in the flow chart of FIG. 8, the control unit 109 is initialized after the key or ignition switch is turned on, and then, at step S1, the output of the vehicle-speed sensor 10 is input to the vehicle-speed measuring means 109b to measure the travelling speed V of the vehicle. At step S2, the steering-torque measuring means 9a measures the steering torque $T_S$ imparted to the steering wheel 1 by the operator, and the steering-torque change-rate calculating means 109h calculates the change rate of the steering torque $\Delta T$ from the presently measured steering torque $T_S$ and the precedingly measured steering torque $T_{S0}$ and sends out an output signal representative of the calculated steering-torque change rate $\Delta T$ to the motor-current determining means 109e. Subsequently, the motor-current determining means 109e reads out from the motor-current multiplier memory means 109c an appropriate motor-current multiplier $K_I$ corresponding to the calculated steering-torque change rate $\Delta T$ at step S4, and also reads out from the motor-current memory means 109d an appropriate motor current value $I_{M1}$ corresponding to the measured steering torque $T_S$ at step S5.

Thereafter, at step S6, the motor-current determining means 109e calculates an appropriate motor current value $I_M$ to be supplied to the motor 13 by multiplying the read-out motor current value $I_{M1}$ by the read-out motor-current multiplier $K_I$. The motor current $I_M$ thus calculated takes a wave form as shown in FIG. 7 which has a smaller width or period $t_{D2}$ much smaller than that $t_{D1}$ of the motor current of FIG. 3.

At step S7, it is determined whether or not the vehicle speed V is less than a first reference speed level $V_1$, and if it is determined "YES", the current $I_M$ calculated at step S6 is supplied to the motor 13 under the control of the motor-current controlling means 109f at step S8 so that the amplitude of fluctuation $T_{S2}$ in the steering torque $T_S$ is substantially suppressed or reduced as illustrated in FIG. 7 in comparison with the amplitude $T_{S2}$ of the steering-torque fluctuation of the prior art shown in FIG. 3. On the other hand, if it is determined "NO" at step S7, an offset current $I_{OF}$ (about 2-10 amperes) is output to the motor 13 at step S9.

Further, at step S10, it is determined whether or not the vehicle speed V is less than a second reference speed level $V_2$ which is greater than the first reference speed level $V_1$, and if it is determined "YES", the electromagnetic switching clutch 16 is switched on or held connected under the control of the clutch controlling means 109g thereby to mechanically connect the motor 13 with the steering rack 6 via the speed-reduction gear R, the electromagnetic switching clutch 16, the pinion 17 and the second rack tooth portion 6b so that the steering system is made into or held in a power-assisted steering mode. On the other hand, if it is determined "NO" at step S10, the electromagnetic switching clutch 16 is then switched off by the clutch controlng means 109g to disconnect the motor 13 from the steering rack 6, thus making the steering system into a non-power assisted manual steering mode.

Actually, during travel of the vehicle, the motor-current determining means 109e controls the current supplied to the motor 13 with relation to the vehicle speed in a manner as illustrated in FIG. 6. Specifically, the 100% motor current as determined at step S6 in FIG. 8 is output until the vehicle speed increases above the first reference speed level $V_1$ at point d in FIG. 6 (at step S8 in FIG. 8); is sharply decreased to the offset current level $I_{OF}$ at point d and held constant at that level in order to alleviate the inertia influence from the mechanical portions of the power steering system as the vehicle speed further increases above the first reference speed level $V_1$ (at step S9 in FIG. 8); and is decreased to zero at point e when the vehicle speed V increases to reach the second reference speed level $V_2$ (at step S12 in FIG. 8). Also, at point e, the voltage imposed on the electromagnetic switching clutch 16 is reduced to zero to switch off or disconnect the clutch 16 under the control of the clutch controlling means 109g so that the mechanical coupling between the worm wheel 15 and the second pinion 17 is released, thereby making the steering system into a non-power assisted mannual steering mode (at step S12). In this case, there will be no great shock developed upon switching off of the clutch 16 since the fluctuation in the steering torque is substantially suppressed or reduced as previously described and the motor current is reduced to the offset level before the clutch 16 is switched off.

After the electromagnetic switching clutch 16 has been switched on at step S11 or switched off at step S12, the control process proceeds to step S13 wherein the presently measured steering torque value $T_S$ is stored as the precedingly measured steering-torque value $T_{S0}$ by the motor-current memory means 109d, and the control process returns from step S13 to step S1.

Figure 9:
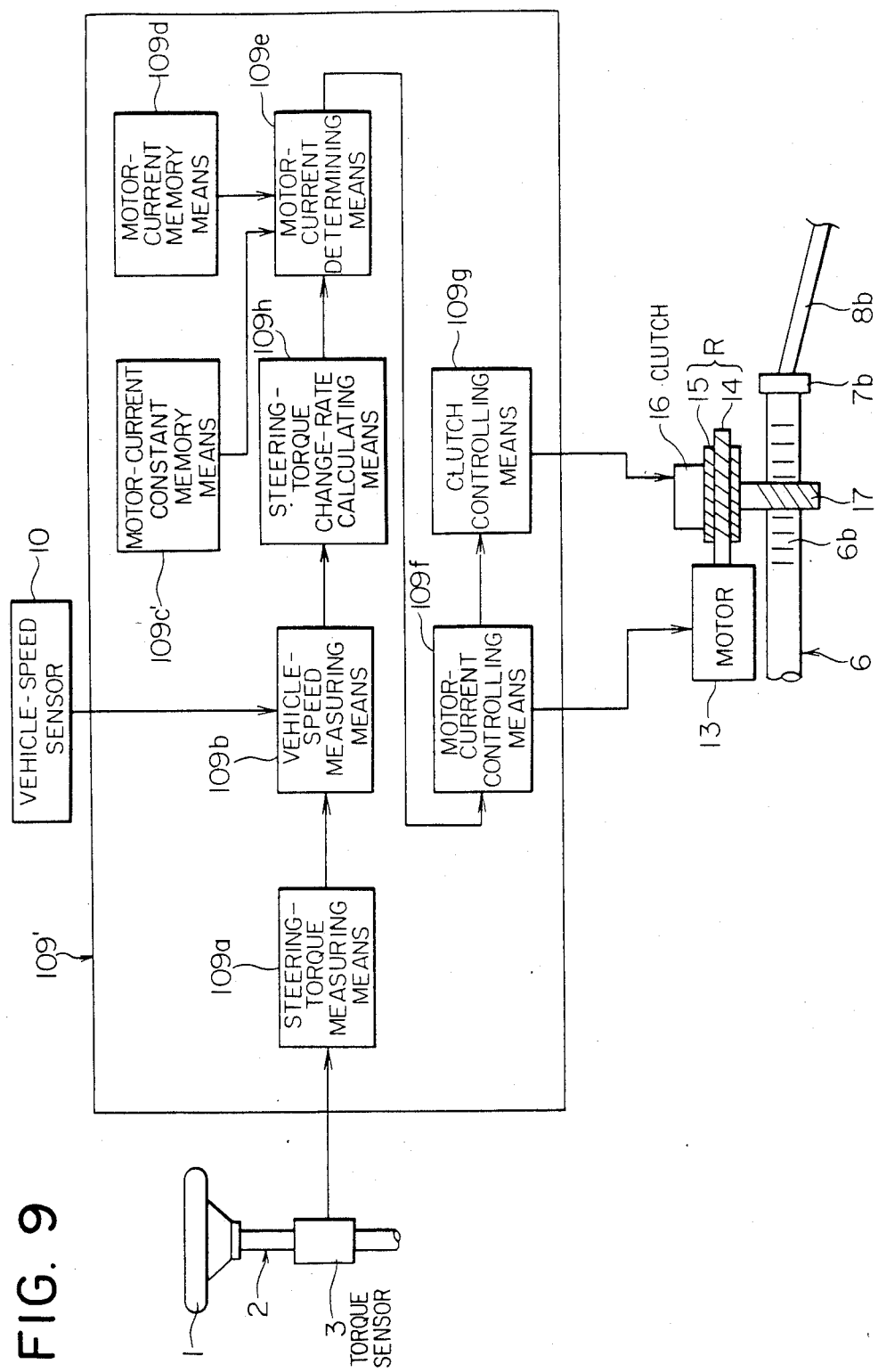
FIG. 9 is a block diagram showing a control unit and its related parts in accordance with another embodiment of the present invention.

FIG. 9 shows a modified form of control unit 109' in accordance with the present invention, which is similar to that designated by 109 in FIG. 4 except for the fact that a motor-current constant memory means 109c' is employed in place of the motor-current multiplier memory means 109c of FIG. 4. In this modification, the motor-current constant memory means 109c' serves to store motor-current constants which correspond to varying steering-torque change rates, and the motor-current determining means 109e is adapted to receive the output signals from the steering-torque measuring means 109a, the vehicle-speed measuring means 109b, the steering-torque change-rate calculating means 109h, the motor-current constant memory means 109c' and the motor-current memory means 109d, and reads out from the memory means 109c' and 109d an appropriate motor-current constant $I_K$ which corresponds to the calculated steering-torque change rate $\Delta T$ and an appropriate motor-current value $I_{M1}$ which corresponds to the measured steering torque $T_S$ to add the read-out motor-current constant $I_K$ to the read-out motor-current value $I_{M1}$ so as to determine an appropriate motor-current supplied to the motor 13.

The motor-current constants $I_K$ are empirically determined with respect to the steering-torque change rates $\Delta T$ through experiments in accordance with the characteristics of the steering system. An example of such motor-current constants $I_K$ is shown in Table 2 below.

TABLE 2

| $\Delta T$ | $I_K$ |
|---|---|
| +5 or above | +10 |
| +4 - +3 | +5 |
| +2 - -2 | 0 |
| -3 - -4 | -5 |

TABLE 2-continued

| $\Delta T$ | $I_K$ |
|---|---|
| -5 or below | -10 |

Figure 10:
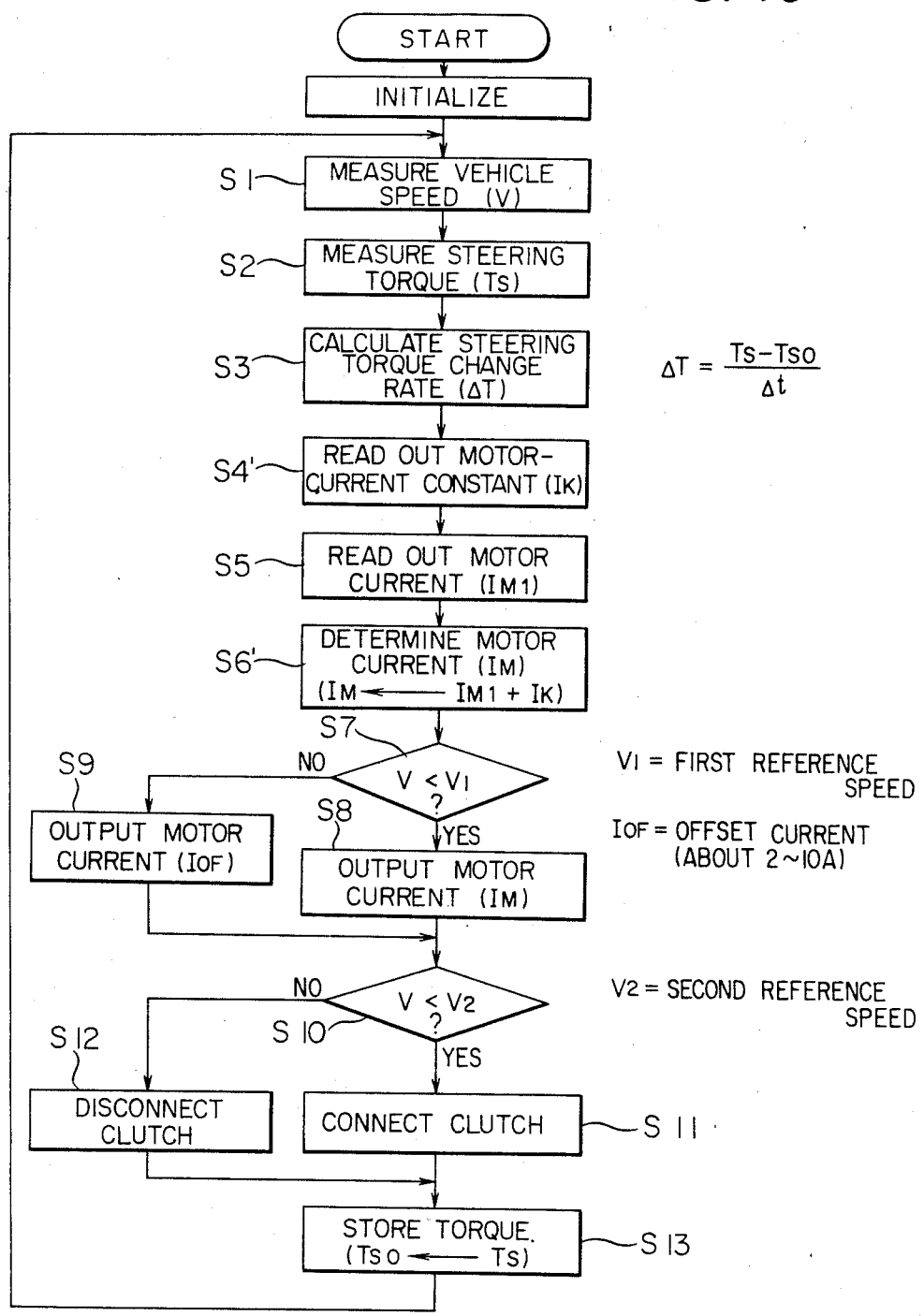
FIG. 10 is a flow chart showing the control process of the power steering system of FIG. 1 as controlled by the control unit of FIG. 7.

FIG. 10 shows the control process in accordance with the modified control unit 109' of FIG. 9 which is similar to that of the control unit 109 illustrated in FIG. 8 except for the fact that steps S4 and S6 of FIG. 8 are replaced by steps S4' and S6'. Namely, in FIG. 10, at step S4', the motor-current determining means 109e reads out an appropriate motor-current constant $I_K$ which corresponds to the steering-torque change rate calculated at step S2, and at step S6', determines an appropriate motor current $I_M$ supplied to the motor 13 by adding the read-out motor-current constant $I_K$ to an appropriate motor-current value $I_{M1}$ which is read out from the motor-current memory means 109d. The remaining process steps S1 through S3, S5, S7 through S13 are the same as those shown in FIG. 8, and the operation of this modified control unit 109' is substantially similar to that of the control unit 109. Therefore, further detailed description thereof is omitted.

As described in the foregoing, according to the present invention, the current supplied to the motor is controlled derivaratively or minutely by determining an appropriate motor current on the basis of an appropriate motor curent value which is prestored and corresponds to the measured steering torque, and an appropriate motor-current multiplier or constant which is prestored and corresponds to the calculated change rate of the steering torque, whereby fluctuation in the steering torque due to time lags in operation of various component members can be substantially suppressed or reduced, thus preventing resultant vibrations of the steering system for smooth and stable steering operation. This can be done merely by replacing an old control program for the control unit by a new control program of the present invention so that an existing motor-driven power steering system can be readily revised or modified at low cost to provide improved steering feeling without changing the mechanical structure of the steering system.

What is claimed is:

1. A motor-driven power steering system for a vehicle having a steering wheel operatively connected to steer steerable road wheels in response to force exerted thereon by an operator, said motor-driven power steering system comprising:
    a torque sensor connected to detect operator-induced steering torque resulting from steering force exerted on said steering wheel by the operator to generate an output signal representative thereof;
    a vehicle-speed sensor for detecting vehicle speed to generate an output signal representative thereof;
    a motor operatively connected with said steerable road wheels and connected to be energized by a source of electric power to transmit a force to said steerable road wheels for power-assisting steering motion caused by the operator through said steering wheel;
    a clutch means interposed between said motor and said steerable road wheels and connected to be switched on and off for selectively establishing and interrupting the transmission of the power-assisting force from said motor toward said steerable road wheels in accordance with the vehicle speed; and a control unit connected to receive output signals from said torque sensor and said vehicle-speed sensor for controlling respective running and switching operations of said motor and said clutch means, said control unit including means responsive to the operator-induced steering torque to determine fluctuations in steering torque due to time lags in operation and to vary the running and switching operations so as to reduce the fluctuations during transmission of the power-assisting force from said motor to said steerable road wheels.

2. A motor-driven power steering system for a vehicle according to claim 1 wherein said control unit comprises:
 a steering-torque measuring means connected to receive the output signal from said torque sensor for measuring the operator-induced steering torque;
 a vehicle-speed measuring means connected to receive the output signal from said vehicle-speed sensor for measuring the vehicle speed;
 a steering-torque change-rate calculating means connected to calculate a rate of change per unit time of the steering torque on the basis of a presently measured steering torque value and a precedingly measured steering torque value, and generate an output signal representative of the calculated steering-torque change rate;
 a first memory means for storing motor-current constants corresponding to varying steering-torque change rates;
 a second memory means for storing motor-current values corresponding to varying steering torque values;
 a motor-current determining means connected to receive output signals from said steering-torque measuring means, said vehicle-speed measuring means, and said steering torque change-rate calculating means to determine an appropriate motor-current constant corresponding to the calculated steering-torque change rate and an appropriate motor-current value correponding to the measured steering torque on the basis of the constants and values respectively stored in said first and second memory means so as to calculate a current to be supplied to said motor by adding the appropriate motor-current value to the appropriate motor-current constant;
 a motor-current control means for controlling the running operation of said motor in accordance with the calculated current from said motor-current determining means; and
 a clutch controlling means for controlling the switching operation of said clutch means on the basis of the calculated current from said motor-current determining means.

3. A motor-driven power steering system for a vehicle according to claim 2 wherein said motor-current determining means determines whether the measured vehicle speed is less than a first reference speed level and a second reference speed level which is greater than the first reference speed level, and wherein said control unit includes means to control the respective running and switching operations of said motor and said clutch means in such a manner that when the measured vehicle speed is less than the first reference level, the calculated current, as determined by said motor-current determining means, is supplied to said motor and said clutch means is switched on; that when the measured vehicle speed is at least equal to the first reference speed level but less than the second reference speed level, the current supplied to said motor is reduced to an offset current level and said clutch means is switched on; and that when the measured vehicle speed is at least equal to the second reference speed level, the current supplied to said motor is made to be zero and said clutch means is switched off.

4. A motor-driven power steering system for a vehicle having a steering wheel operatively connected to steer steerable road wheels in response to force exerted thereon by an operator, said motor-driven power steering system comprising:
 a torque sensor connected to detect operator-induced steering torque resulting from steering force exerted on said steering wheel by the operator to generate an output signal representative thereof;
 a vehicle-speed sensor for detecting vehicle speed to generate an output signal representative thereof;
 a motor operatively connected with said steerable road wheels and connected to be energized by a source of electric power to transmit a force to said steerable road wheels for power-assisting steering motion caused by the operator through said steering wheel;
 a clutch means interposed between said motor and said steerable road wheels and connected to be switched on and off for selectively establishing and interrupting the transmission of the power-assisting force from said motor toward said steerable road wheels in accordance with the vehicle speed; and
 a control unit connected to receive output signals from said torque sensor and said vehicle-speed sensor for controlling respective running and switching operations of said motor and said clutch means in such a manner that fluctuations in the steering torque due to time lags in operation during transmission of the power-assisting force from said motor to said steerable road wheels us substantially reduced wherein said control unit comprises:
 a steering-torque measuring means connected to receive the output signal from said torque sensor for measuring the operator-induced steering torque;
 a vehicle-speed measuring means adapted to receive the output signal from said vehicle-speed sensor for measuring the vehicle speed;
 a steering-torque change-rate calculating means adapted to calculate a rate of change per unit time of the steering torque on the basis of a presently measured steering torque value and a precedingly measured steering torque value, and generate an output signal representative of the calculated steering-torque change rate;
 a first memory means for storing motor-current multipliers corresponding to varying steering torque values;
 a second memory means for storing motor-current multipliers corresponding to varying steering torque values;
 a motor-current determining means connected to receive output signals from said steering-torque measuring means, said vehicle-speed measuring means, and said steering torque change-rate calculating means to determine an appropriate motor-current multiplier corresponding to the calculated steering-torque change rate and an appropriate motor-current value correponding to the measured steering torque on the basis of the multipliers and values respectively stored in said first and second memory means so as to calculate a current to be supplied to said motor by multiplying the appropriate motor-current value by the appropriate motor-current multiplier;

a motor-current control means for controlling the running operation of said motor in accordance with the calculated current from said motor-current determining means; and a clutch controlling means for controlling the switching operation of said clutch means on the basis of the calculated current from said motor-current determining means.

5. A motor-driven power steering system for a vehicle according to claim 2 wherein said motor-current determining means determines whether the measured vehicle speed is less than a first reference speed level and a second reference speed level which is greater than the first reference speed level, and wherein said control unit includes means to control the respective running and switching operations of said motor and said clutch means in such a manner that when the measured vehicle speed is less than the first reference level, the calculated current, as determined by said motor-current determining means, is supplied to said motor and said clutch means is switched on; that when the measured vehicle speed is at least equal to the first reference speed level but less than the second reference speed level, the current supplied to said motor is reduced to an offset current level and said clutch means is switched on; and that when the measured vehicle speed is at least equal to the second reference speed level, the current supplied to said motor is made to be zero and said clutch means is switched off.

* * * * *